8680X
R. Heinisch,
Shears.
Patented Mar. 11, 1835.
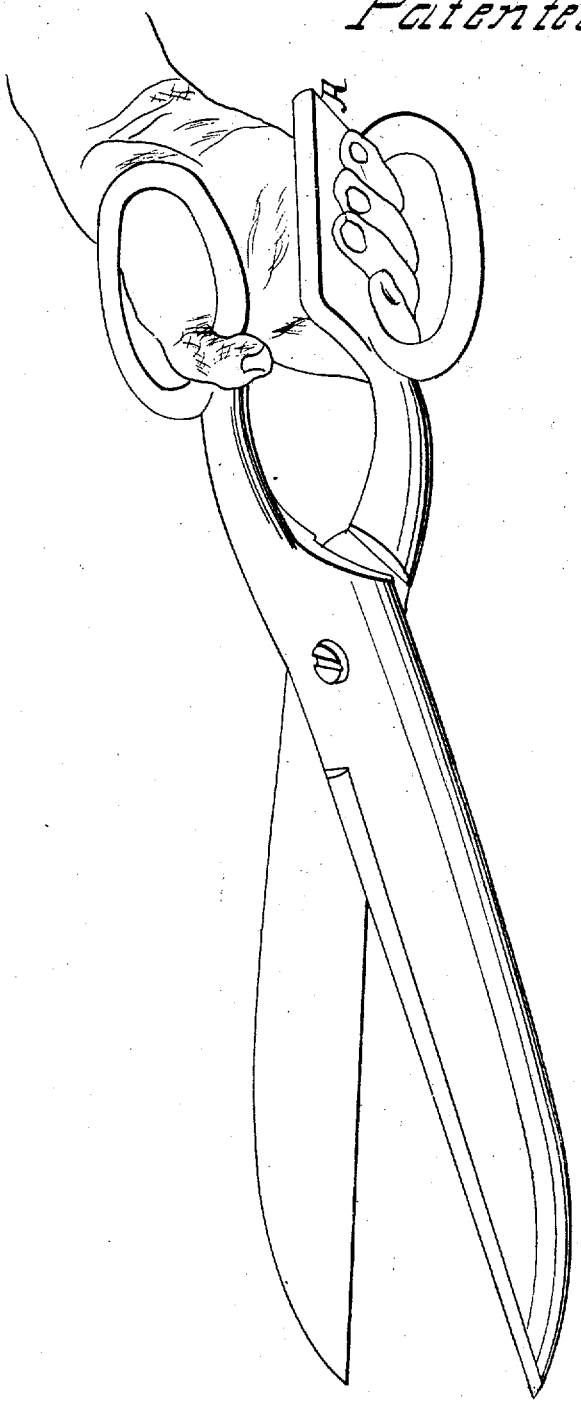

8680X Mar 11 1835 269

John Andrews Assignee of
^ Rochius Heinisch of Newark New Jersey

Letters Patent.

The Schedule referred to in these Letters Patent and making part of the same containing a
description in the words of the said Rochius Heinisch himself of his improvement in the
construction of a Tailors Shears.

To all to whom these presents shall come. Be it Known that I Rochi-
us Heinisch of the Town of Newark County of Essex and State of New Jersey have invented a
new and useful improvement in the "Tailors Shears, called the Patent improved Tailors
Shears" by the application of a Lever Power to the Knives or cutting edges of the shears. produc-
ed from the lower bow or handle with less effort and greater ease to the cutter or operator than
with the shears in common use. and the following is a full and exact description thereof.
To the side of the lower circular bow. bowl or handle of the shears is added or affixed a helm
or horizontal plate against which the finger passing through the lower bow or handle acts
by a natural muscular action or contraction of the fingers pressing upwards. thus increas-
ing the power of the Knife attached to the handle. relieving one half or more of the down-
ward pressure required by the exertion of the thumb held in the upper bowl or ~~upper~~ handle and
producing a simultaneous action with an equal distribution of power upon the two Knives
or cutting edges of the shears. By this operation the left hand which is frequently required
in the use of the common shears to press upon the upper bow or handle to relieve the thumb
is left at perfect liberty to hold and shape or shift the cloth in any position required. whilst the right
hand holds and uses the Shears with greater ease and freedom. and the thumb is relieved from
the unequal pressure against the fingers which in the common shears are almost wholly
passive. which not unfrequently causes painful and distressing cramps in the hand. as well
as blisters the lower joint of the thumb. This plate or Helm which is the improvement above
described and claimed, may be made of the same material with the shears or of any other ~~metal~~,
wood. ivory or bone separately ~~and~~ affixed to, or cast or wrought ~~in~~ with the shears
The said improvement is marked on the accompanying draft or drawing by the word
"Improvements" written thereon. And which I claim as my own invention and was
not previously known. In testimony that the above is a true specification of my
said improvement as above described I have hereunto set my hand this twenty eighth day
of February. in the year of our Lord one thousand eight hundred and thirty five Witnesses Robert Ward
Wm H Bell
5 Broad St. N.Y.

R. Heinisch

Exd. W.K.

(4 8 0 words)

Drawing Made